Figure 1:
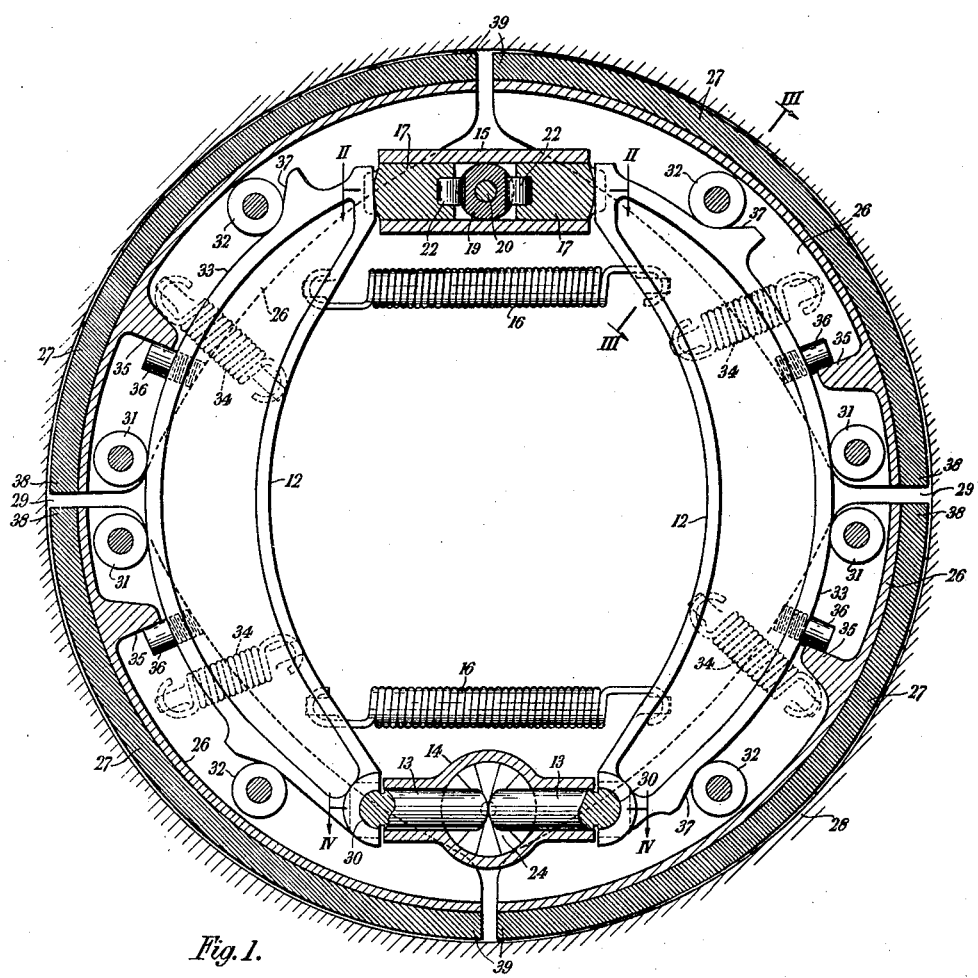

Feb. 3, 1942.  F. R. COWELL  2,271,815
INTERNALLY EXPANDING BRAKE
Filed April 3, 1941  5 Sheets-Sheet 2

Inventor
Frederick R. Cowell
By
Watson, Cole, Grindle & Watson
Attys.

Feb. 3, 1942.  F. R. COWELL  2,271,815
INTERNALLY EXPANDING BRAKE
Filed April 3, 1941  5 Sheets-Sheet 3

Inventor
Frederick R. Cowell
By
Watson, Cole, Grindle & Watson
Attys.

Inventor
Frederick R. Cowell
By
Watson, Cole, Grindle & Watson
Attys.

Patented Feb. 3, 1942

2,271,815

UNITED STATES PATENT OFFICE 2,271,815

INTERNALLY EXPANDING BRAKE

Frederick Raymond Cowell, Leeds, England, assignor to Kirkstall Forge Limited, Leeds, Yorkshire, England Application April 3, 1941, Serial No. 386,710
In Great Britain November 14, 1940

10 Claims. (Cl. 188—78)

Internally expanding brakes as at present used on motor road vehicles comprise two shoes, which pivot on separate anchor pins, and a cam, wedge or other expanding device for applying pressure to the free ends of the shoes so as to force them outwards against the action of a spring or springs, thereby bringing the brake linings on the outer faces of the shoes into contact with the brake drum.

I have found that with these brakes there is a limit to the length of brake lining which can be effectively used, and that the best results are obtained when each lining is of a length subtending an angle of about 100° at the centre of the brake drum. If the linings are made longer than this, the ends of the linings do very little work, owing to the fact that every portion of each lining moves radially about the pivot of its associated shoe, with the result that the ends of the linings do not wear out in service.

The total area of brake lining used must be proportional to the total gross weight of the vehicle, and the ideal brake would therefore have brake lining extending around the whole 360° of the brake drum, in order to enable the narrowest possible shoes to be used. The above type of brake in which each brake shoe only has 100° of effective brake lining, has therefore the disadvantage that the width of the shoe must be made large to give the necessary area of contact between the lining and the drum.

Furthermore, with the above type of brake the maximum braking effort is not uniformly applied but a maximum load is applied to the drum at two diametrically opposite points, with the result that the brake drum tends to go oval unless it is made strong enough to withstand this load. The brake drum must therefore be of heavy construction, particularly on goods carrying vehicles where the gross vehicle weight is high and the braking load correspondingly large.

The object of the present invention is to provide an internally expanding brake in which the effective length of the brake lining is increased and the braking load more uniformly applied, thus enabling the brake shoes to be made narrower and the brake drum to be made lighter.

The invention accordingly provides an internally expanding brake, comprising a pair of brake-shoe-carriers which are normally held inoperative and which move outwardly to apply the brake, each carrier supporting a plurality of brake shoes, all of which are arranged to present one end to the brake drum before the other on outward movement of the carrier and are free to move circumferentially with respect to the carrier to a limited extent when contacted by the revolving brake drum, and means operative on circumferential movement of the shoes as aforesaid to tilt the shoes in relation to the carrier so as to approach the remote ends of the shoes towards the drum, thereby equalising the braking pressure over the contacting faces of the shoes and the drum. By the expression "remote ends of the shoes" is meant the ends of the shoes remote from those first contacted by the drum. Owing to the tilting of the shoes a greater area of the braking surfaces thereof is brought into effective contact with the brake drum than is possible with the known arrangement mentioned above. Indeed the braking surface can be made to extend around the entire circumference of the brake drum apart from small working clearances between adjacent shoes. The shoes may therefore be made narrower than is possible with the existing type of brake referred to above. Furthermore, the equalization of pressure around the surface of the drum avoids any tendency for the drum to distort into oval shape, with the result that it can be made of lighter construction. Normally, in the case of brakes for motor road vehicles, it is sufficient to arrange for combined circumferential and tilting movement as aforesaid to take place only when the vehicle is moving in a forward direction, because when the vehicle is in reverse, the speed of travel is so slow that it is unnecessary to provide a high braking efficiency, and it is safe to rely, for braking in reverse, solely on those parts of the braking surfaces of the shoes which first make contact with the drum on application of the brake. In this case it is only necessary to provide stops or the equivalent for limiting reverse circumferential movement of the brake shoes. If, however, it is desired to arrange for the brake to operate with equal efficiency in the reverse as well as in the forward direction, this may be done by so mounting the shoes on their carriers that they are given the necessary tilting movement when they move circumferentially in either direction.

In one arrangement according to the invention, the shoes are supported on their carriers by co-operating rollers and tracks which permit of the aforesaid circumferential movement of the shoes, the tracks being shaped to provide the tilting movement of the shoes.

As an alternative the shoes may be supported on their carriers by pivoted links arranged to effect simultaneously the aforesaid circumferential and tilting movements of the shoes.

In the preferred form of the invention, the reactions at the remote ends of the shoes are taken direct on the axle casing, or on a structure secured to the axle casing instead of on the carriers. These reactions tend to push the shoes off the drum and by transferring them to the axle casing a greater braking pressure can be applied than is possible when they are communicated to the carriers and consequently have to be resisted by the driver's effort on the brake pedal or lever.

It is preferred to provide springs for constraining the shoes to return to their initial positions when released from the brake drum. The brake may however incorporate some form of friction device for maintaining the shoes in the tilted position when the brake is released, as for instance by preventing the rollers from returning along the tracks, provided such device permits of further outward movement being communicated to the remote ends of the shoes as the lining becomes worn, this being necessary to preserve the uniform distribution of braking pressure between the shoes and the drum.

An internally expanding brake has been proposed having two pivoted shoe-carriers adapted to be spread outwardly to apply the brakes, and each supporting, with capability of limited circumferential movement relative to itself, two brake shoes pivotally linked together. In this arrangement, application of the brake caused one shoe on each carrier to press against the drum and, by reason of its frictional contact therewith, to move circumferentially together with its linked shoe, the latter carrying a roller which cooperated with a fixed cam surface to press said shoe outwardly against the drum. In the arrangement according to the invention, however, each shoe derives its combined circumferential and tilting movement by contact of that shoe with the drum, and not as a result of another shoe linked with it contacting with the drum. In another known arrangement, three linked shoes were provided, mounted for limited circumferential movement on a pair of carriers, the shoe system being carried bodily round by the drum on application of the brakes, until the free end of the leading shoe contacted with a fixed abutment which forced said free end outwards. According to the invention, however, all of the shoes present one end first to the drum and thereby receive a combined circumferential and tilting movement which approaches their other ends to the drum.

Figure 2:
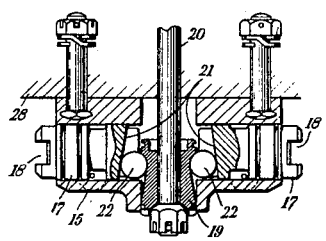
Figure 3:
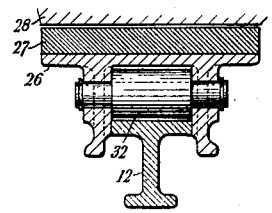
Figure 4:
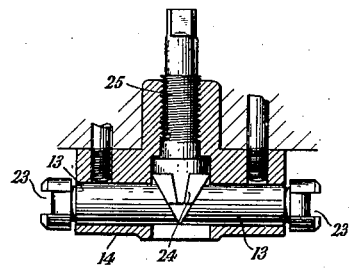
Figure 5:
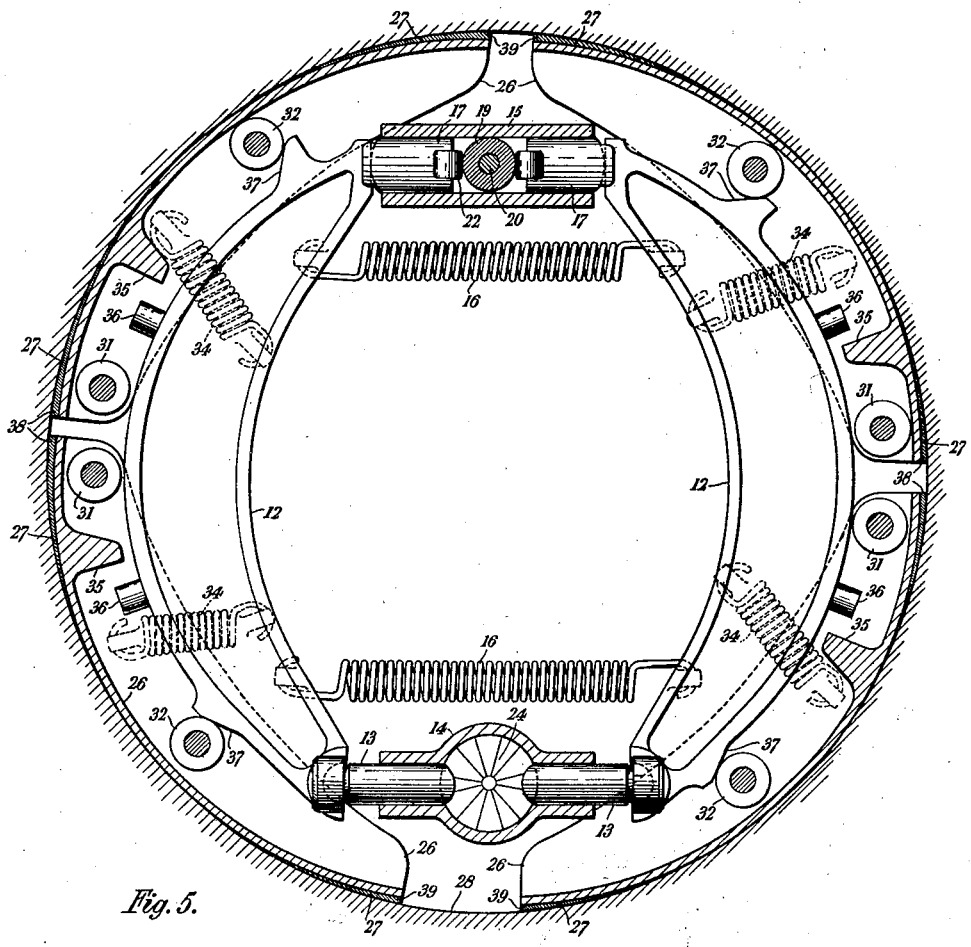
Figure 6:
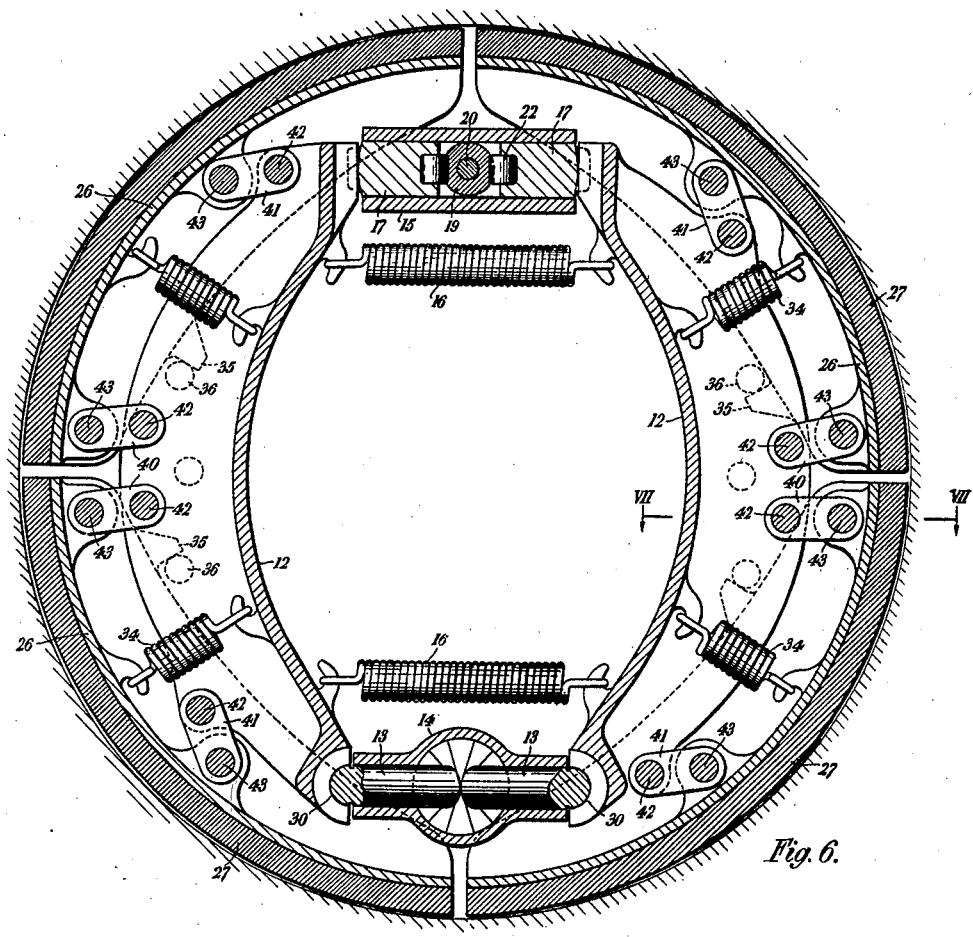
Figure 7:
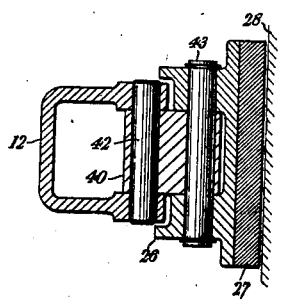
Figure 8:
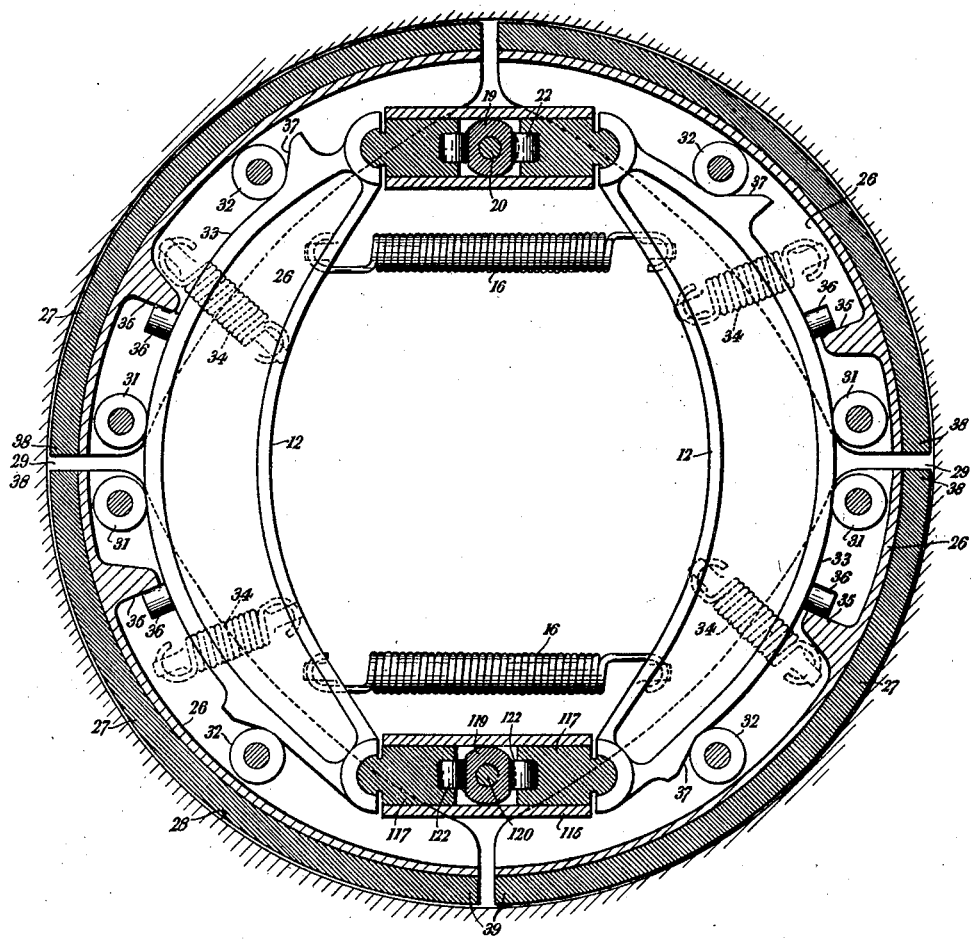
Figure 9:
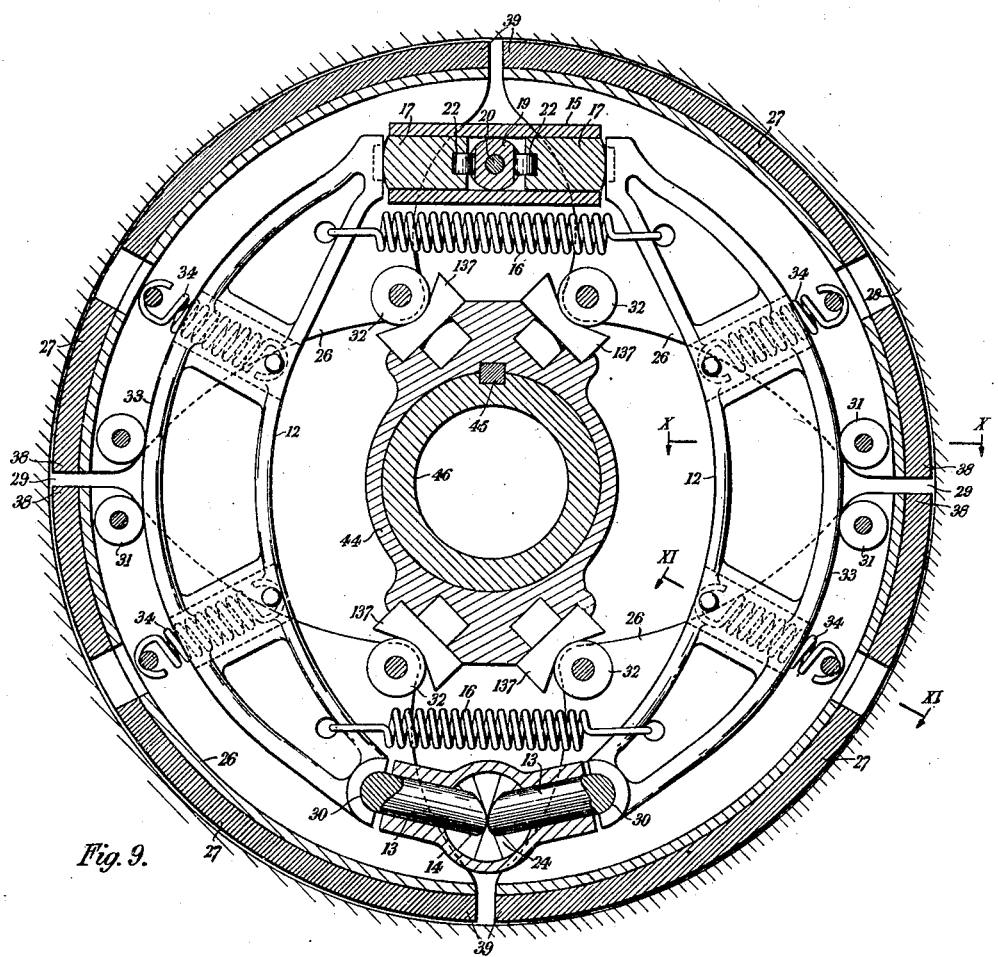
Figure 10:
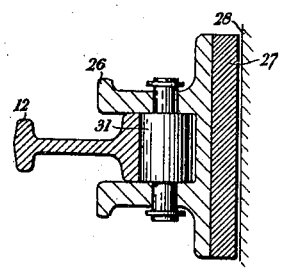
Figure 11:
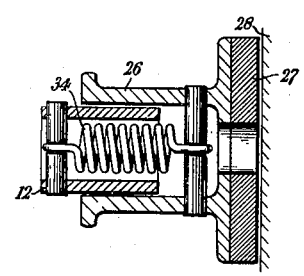

A number of different forms of brake for motor road vehicles constructed in accordance with the invention will now be described, in detail, by way of example, with reference to the accompanying drawings, in which Figure 1 is a vertical section through the brake drum of the first form showing the carriers in elevation and the brake off with new linings, Figures 2, 3 and 4 are sections taken respectively on the lines II—II, III—III and IV—IV in Figure 1, Figure 5 is a sectional view similar to Figure 1, but showing the brake on and the linings worn, Figure 6 is a sectional view similar to Figure 1 showing an alternative construction, the carriers in this case being shown in section, Figure 7 is a section on the line VII—VII in Figure 6, Figure 8 is a sectional view similar to Figure 1 showing a third arrangement, Figure 9 is a sectional view similar to Figure 1 showing a fourth arrangement, and Figures 10 and 11 are sections taken respectively on the lines X—X and XI—XI in Figure 9.

Like reference numerals indicate like parts throughout the drawings.

Referring first of all to the arrangement shown in Figures 1–5, two carriers 12 are provided, pivoted at one end 30 on anchor pins 13 carried by a brake adjuster 14 located between the anchor pins, the adjuster being operable, in known manner, to space the anchor pins further apart for the purpose of counteracting wear on the brake linings. The carriers 12 are of approximately semi-circular form and an expanding device 15 is located between the free ends of the carriers, this device being operable to force the carriers outwardly about their pivots 30 against the action of springs 16 interconnecting the carriers in order to apply the brake.

As will be seen from Figure 2, in the brake expander 15 are mounted two slidable tappets 17, formed at their outer ends with slots 18 to accommodate the ends of the carriers 12. Between the inner ends of the tappets 17 is disposed a cam 19 fixed to an operating rod 20 and abutting against the oblique inner faces 21 of the tappets 17 through the agency of anti-friction rollers 22. On actuation of the brake pedal or lever, the rod 20 is moved upwards as seen in Figure 2 thereby forcing the tappets outwards to expand the carriers against the action of the springs 16 (see Figure 5). On release of the pressure on the brake pedal or lever, the springs 16 return the parts to the initial position, thereby taking off the brake.

The details of the brake adjuster are shown in Figure 4. Between the inner ends of the anchor pins 13, which are formed at their outer ends with slots 23 to receive and form the pivots for the ends 30 of the carriers 12, is located a cone 24 having a threaded shank 25. When it is desired to adjust the brakes to take up wear in the linings, the shank 25 is screwed in thereby forcing the anchor pins 13 outwards (see Figure 5) to distance the pivoted ends 30 of the carriers 12 further apart.

On each carrier 12 is mounted a pair of U-section brake shoes 26, each carrying on its outer face a lining 27 extending around approximately a quadrant of the brake drum 28. There is a slight clearance 29 between the adjacent ends of the two shoes on each carrier, which is located at a point about 90° away from the pivot 30 of the carrier. Each shoe 26 is supported by a pair of rollers 31, 32 on a circumferential track 33 on the carrier, and is connected to its carrier by a spring 34 which normally retains the shoe in a rest position in which a projection 35 extending inwardly from the shoe engages a fixed stop 36 on the carrier, the spring 34 opposing circumferential movement of the shoe in relation to the carrier in the direction of forward rotation of the brake drum.

Assuming the vehicle to be moving forwards, when the brake is applied the adjacent ends 38 of the linings on the two shoes on each carrier which, as described above, are located at about 90° from the pivot of the carrier, will first meet the rotating brake drum. The drum will then drag the shoes round with it, causing them to travel circumferentially in a forward direction (i. e. clockwise as seen in Figure 1). Ramps 37 are provided on the track 33 which cause the rollers 32 at the remote ends of the shoes to lift (see Figure 5), thereby tilting the shoes to bring the remote ends 39 of the linings into closer contact with the brake drum 28. When the brake is released the shoes are returned to the initial position by their springs 34. The outward movement of the remote ends of the shoes on braking enables the whole of the brake lining to be effectively utilized, and the braking pressure to be approximately equalised over the whole surface of the drum, with the attendant advantages referred to above. This may be clearly seen from Figure 5, which shows that the lining is worn down substantially uniformly around the whole periphery of the brake drum. It will be appreciated that, using four brake shoes as described above, it is possible to employ an effective brake lining extending around almost the whole 360° of the drum, but the invention is not confined to the use of four shoes. Indeed any convenient number of shoes may be used, and it will not be necessary in all cases to extend the brake lining completely around the drum.

When the vehicle is moving in reverse, the stops 36 will restrain the shoes against reverse circumferential rotation. The speed of travel will however generally be so slow that the braking effect of the adjacent ends of the shoes will be sufficient. If desired, however, the stops may be replaced (as described later with reference to Fig. 9) by additional ramps on the track, inclined in the opposite direction to those 37 operating during forward braking, which permit the shoes to move in the reverse circumferential direction and serve to tilt them so as to equalize the braking pressure.

In the arrangement shown in Figures 6 and 7, the construction is generally similar except that the brake shoes 26 are supported on their carriers 12, each by a pair of pivoted links 40, 41, located respectively at the adjacent and remote ends of the shoe, the links 40, 41 being pivoted at their opposite ends to the carriers and the shoes on pins 42, 43, permitting of forward circumferential movement of the shoes when contacted by the brake drum, and serving on such circumferential movement occurring, to move the remote ends of the shoes outwards to equalize the braking pressure. As before, stops 36 coacting with projections 35 on the shoes are provided for limiting reverse circumferential movement of the shoes.

The carriers need not necessarily be mounted on pivots, but the brake adjuster aforesaid may be replaced by a second expander, the two expanders operating to force the carriers bodily outwards to apply the brakes.

Such an arrangement is shown in Figure 8. The apparatus is in all respects similar to that shown in Figures 1-5 except that the brake adjuster 14 of Figure 1 is replaced by a second expander 115 similar in construction to the expander 15. In this case, actuation of the brake pedal or lever causes axial movement of the rods 20, 120 of the two expanders, thereby, through the agency of the cams 19, 119, and the anti-friction rollers 22, 122, moving the two sets of tappets 17, 117 outwards to force the carriers 12 bodily apart.

In all of the arrangements so far described and illustrated the reactions at the remote ends of the brake shoes are taken on the carriers. These reactions tend to push the brake shoes off the drum and consequently in these cases have to be resisted by the driver's effort on the brake pedal or lever.

In the arrangement shown in Figures 9-11 however, the ramps 137 which communicate the outward movement to the remote ends of the brake shoes 26 through the agency of the rollers 32 are located on the axle casing. Each ramp 137 as shown is of V-form and therefore effective to move the remote ends of the shoes outwards for both directions of rotation of the brake drum 28. The ramps are secured to a brake anchor bracket 44 secured by a key 45 to the hollow axle arm 46. The roller 52 normally rests at the bottom of the V but is urged, on application of the brake, up one or the other limb thereof to tilt the shoe according as whether the vehicle is travelling forward or in reverse.

The arrangement shown in Figures 9-11 shares the advantages of those previously described, viz. utilizing the whole of the frictional material of the brake linings and equalization of the braking pressure around substantially the whole of the surface of the brake drum, but has the additional advantage of enabling a greater braking effort to be built up due to the reactions at the remote ends of the shoes being transmitted to the axle casing, so that they no longer oppose the braking effort exerted by the driver.

Although the invention has been described mainly with reference to its application to brakes for motor road vehicles, it is to be understood that it may equally well be used in internally expanding brakes for other purposes.

What I claim as my invention and desire to secure by Letters Patent is:

1. An internally expanding brake, comprising a brake drum, a pair of brake-shoe-carriers mounted within the drum, means for retaining the carriers in an inoperative position, an expander for moving the carriers outwardly to apply the brake, a plurality of brake shoes mounted on each carrier for limited circumferential movement in relation thereto all of said shoes being arranged to present one end to the brake drum before the other on outward movement of the carriers, and means operative, on circumferential movement of the shoes when contacted by the revolving brake drum, to tilt the shoes in relation to the carrier so as to approach the remote ends of the shoes towards the drum, thereby equalising the braking pressure over the contacting faces of the shoes and the drum.

2. An internally expanding brake, comprising a brake drum, a pair of brake-shoe-carriers mounted within the drum, means for retaining the carriers in an inoperative position, an expander for moving the carriers outwardly to apply the brake, a plurality of brake shoes on each carrier, all of said shoes being arranged to present one end to the brake drum before the other on outward movement of the carriers, rollers and cooperating tracks providing a connection between the shoes and their carriers permitting of circumferential movement of the shoes relatively to the carriers on contact of the shoes with the revolving brake drum, and ramps on the tracks arranged, on circumferential movement of the shoes as aforesaid, to tilt them so as to approach their remote ends towards the brake drum.

3. An internally expanding brake, comprising a brake drum, a pair of brake-shoe carriers mounted within the drum, means for retaining the carriers in an inoperative position, an expander for moving the carriers outwardly to apply the brake, a plurality of brake shoes on each carrier, all of said shoes being arranged to present one end to the brake drum before the other on outward movement of the carriers, and pivoted links, interconnecting the shoes and their carriers, which permit of combined circumferential and tilting movement of the shoes in relation to the carriers when contacted by the revolving brake drum, said movement approaching the remote ends of the shoes towards the brake drum.

4. An internally expanding brake, comprising an axle casing, a surrounding brake drum, a pair of brake-shoe-carriers disposed between the axle casing and the brake drum, means for retaining the carriers in an inoperative position, an expander for moving the carriers outwardly to apply the brake, a plurality of brake shoes mounted on each carrier for limited circumferential movement in relation thereto, all of said shoes being arranged to present one end to the brake drum before the other on outward movement of the carriers, and means operative, on circumferential movement of the shoes when contacted by the revolving brake drum, to tilt the shoes in relation to the carrier so as to approach the remote ends of the shoes towards the drum and to transfer to the axle casing the reaction loads at the remote ends of the shoes.

5. An internally expanding brake, comprising an axle casing, a surrounding brake drum, a pair of brake-shoe-carriers disposed between the axle casing and the brake drum, means for retaining the carriers in an inoperative position, an expander for moving the carriers outwardly to apply the brake, a plurality of brake shoes mounted on each carrier, all of said shoes being arranged to present one end to the brake drum before the other on outward movement of the carriers, rollers carried at opposite ends of each shoe, tracks on the carriers which cooperate with the rollers to permit the shoes to move circumferentially in relation to the carriers when contacted by the revolving brake drum, and ramps on the axle casing arranged to cooperate with the rollers at the remote ends of the shoes on circumferential movement of the shoes as aforesaid, to tilt the shoes and approach said remote ends to the brake drum.

6. An internally expanding brake, comprising an axle casing, a surrounding brake drum, a pair of brake-shoe-carriers disposed between the axle casing and the brake drum, means for retaining the carriers in an inoperative position, an expander for moving the carriers outwardly to apply the brake, a plurality of brake shoes mounted on each carrier, all of said shoes being arranged to present one end to the brake drum before the other on outward movement of the carriers, rollers carried at opposite ends of each shoe, tracks on the carriers which cooperate with the rollers to permit the shoes to move circumferentially in relation to the carriers when contacted by the revolving brake drum, and V-shaped ramps on the axle casing arranged to cooperate with the rollers at the remote ends of the shoes on circumferential movement of the shoes as aforesaid, to tilt the shoes and approach said remote ends to the brake drum.

7. An internally expanding brake as claimed in claim 1, which comprises a brake adjuster to which the carriers are pivoted at one end and an expander disposed between the other ends of the carriers.

8. An internally expanding brake as claimed in claim 1, which comprises a pair of expanders, located between opposite ends of the carriers and operating to force the carriers bodily apart to apply the brakes.

9. An internally expanding brake, comprising a brake drum, a pair of brake-shoe-carriers mounted within the drum, means for retaining the carriers in an inoperative position, an expander for moving the carriers outwardly to apply the brake, a pair of brake shoes mounted on each carrier for limited circumferential movement in relation thereto, both pairs of shoes being arranged to present their adjacent ends to the brake drum before their remote ends on outward movement of the carriers, and means operative, on circumferential movement of the shoes when contacted by the revolving brake drum, to tilt the shoes in relation to the carrier so as to approach their remote ends towards the drum, thereby equalizing the braking pressure over the contacting faces of the shoes and the drum.

10. An internally expanding brake, comprising a brake drum, a pair of brake-shoe-carriers mounted within the drum, means for retaining the carriers in an inoperative position, an expander for moving the carriers outwardly to apply the brake, a pair of brake shoes mounted on each carrier for limited circumferential movement in relation thereto, both pairs of shoes being arranged to present their adjacent ends to the brake drum before their remote ends on outward movement of the carriers, brake linings on the shoes which extend around substantially the whole periphery of the drum, and means operative, on circumferential movement of the shoes when contacted by the revolving brake drum, to tilt the shoes in relation to the carrier so as to approach their remote ends towards the drum, thereby equalizing the braking pressure over the whole periphery of the drum.

FREDERICK RAYMOND COWELL.